United States Patent
Jeong et al.

(10) Patent No.: US 12,451,166 B2
(45) Date of Patent: Oct. 21, 2025

(54) SEMICONDUCTOR DEVICE AND METHOD OF MANUFACTURING SEMICONDUCTOR DEVICE

(71) Applicant: SK hynix Inc., Icheon (KR)

(72) Inventors: Yong Jin Jeong, Icheon (KR); Sang Gu Yeo, Icheon (KR)

(73) Assignee: SK hynix Inc., Icheon (KR)

(*) Notice: Subject to any disclaimer, the term of this patent is extended or adjusted under 35 U.S.C. 154(b) by 195 days.

(21) Appl. No.: 18/365,726

(22) Filed: Aug. 4, 2023

(65) Prior Publication Data
US 2024/0339135 A1    Oct. 10, 2024

(30) Foreign Application Priority Data

Apr. 6, 2023 (KR) .......... 10-2023-0045257

(51) Int. Cl.
| | |
|---|---|
| *G11C 5/06* | (2006.01) |
| *H10B 63/00* | (2023.01) |
| *H10N 70/00* | (2023.01) |

(52) U.S. Cl.
CPC ........... *G11C 5/063* (2013.01); *H10B 63/84* (2023.02); *H10N 70/021* (2023.02); *H10N 70/841* (2023.02)

(58) Field of Classification Search
CPC ........ G11C 5/063; H10B 63/84; H10B 63/82; H10B 63/845; H10B 63/10; H10N 70/021; H10N 70/841; H10N 70/011; H10N 70/061; H10N 70/20; H10N 70/231; H10N 70/823; H10N 70/826
See application file for complete search history.

(56) References Cited

U.S. PATENT DOCUMENTS

| | | | |
|---|---|---|---|
| 8,344,345 B2 | 1/2013 | Mikawa et al. | |
| 2009/0230378 A1* | 9/2009 | Ryoo | H10N 70/063 257/4 |
| 2012/0256152 A1* | 10/2012 | Kakegawa | H10B 63/30 257/E47.001 |

FOREIGN PATENT DOCUMENTS

KR    1020050002004 A    1/2005

* cited by examiner

*Primary Examiner* — Allison Bernstein

(57) ABSTRACT

A semiconductor device may include a first contact plug, a word line electrically connected to the first contact plug and extending in a first direction, a second contact plug, a bit line extending in a second direction that intersects the first direction, and a memory cell disposed between the word line and the bit line and including a variable resistance layer. The bit line may include a first protruding part that protrudes into the memory cell, a second protruding part that is connected to the second contact plug, and a connection part that connects the first protruding part and the second protruding part and that extends in the second direction.

17 Claims, 36 Drawing Sheets

SEMICONDUCTOR DEVICE AND METHOD OF MANUFACTURING SEMICONDUCTOR DEVICE

CROSS-REFERENCE TO RELATED APPLICATION

This application claims priority under 35 U.S.C. § 119 to Korean Patent Application No. 10-2023-0045257 filed on Apr. 6, 2023, which is incorporated herein by reference in its entirety.

BACKGROUND

1. Technical Field

Embodiments relate to an electronic device and a method of manufacturing an electronic device and, more particularly, to a semiconductor device and a method of manufacturing a semiconductor device.

2. Related Art

The degree of integration of semiconductor devices is basically determined by the area that is occupied by a unit memory cell. As the improvement of the degree of integration of semiconductor devices in which a memory cell is formed on a substrate as a single layer recently reaches its limit, a three-dimensional semiconductor device in which memory cells are stacked on a substrate is proposed. Furthermore, in order to improve operation reliability of such a semiconductor device, various structures and manufacturing methods are developed.

SUMMARY

In an embodiment, a semiconductor device may include a first contact plug, a word line electrically connected to the first contact plug and extending in a first direction, a second contact plug, a bit line extending in a second direction that intersects the first direction, and a memory cell disposed between the word line and the bit line and including a variable resistance layer. The bit line may include a first protruding part that protrudes into the memory cell, a second protruding part that is connected to the second contact plug, and a connection part that connects the first protruding part and the second protruding part and that extends in the second direction.

In an embodiment, a method of manufacturing a semiconductor device may include forming a first contact plug, forming a word line connected to the first contact plug and extending in a first direction, forming a second contact plug, forming a separation insulating layer on the second contact plug, forming a first opening within the word line, forming a second opening that exposes the second contact plug through the separation insulating layer, and forming a bit line including a first protruding part extending in a second direction and disposed within the first opening, a second protruding part disposed within the second opening, and a connection part connecting the first protruding part and the second protruding part, the second direction intersecting the first direction.

DETAILED DESCRIPTION

Hereinafter, embodiments according to the technical spirit of the present disclosure are described with reference to the accompanying drawings.

Embodiments of the present disclosure provide a semiconductor device having a stable structure and improved characteristics and a method of manufacturing a semiconductor device.

According to the present technology, the semiconductor device having a stable structure and improved reliability can be provided.

Figure 1A:
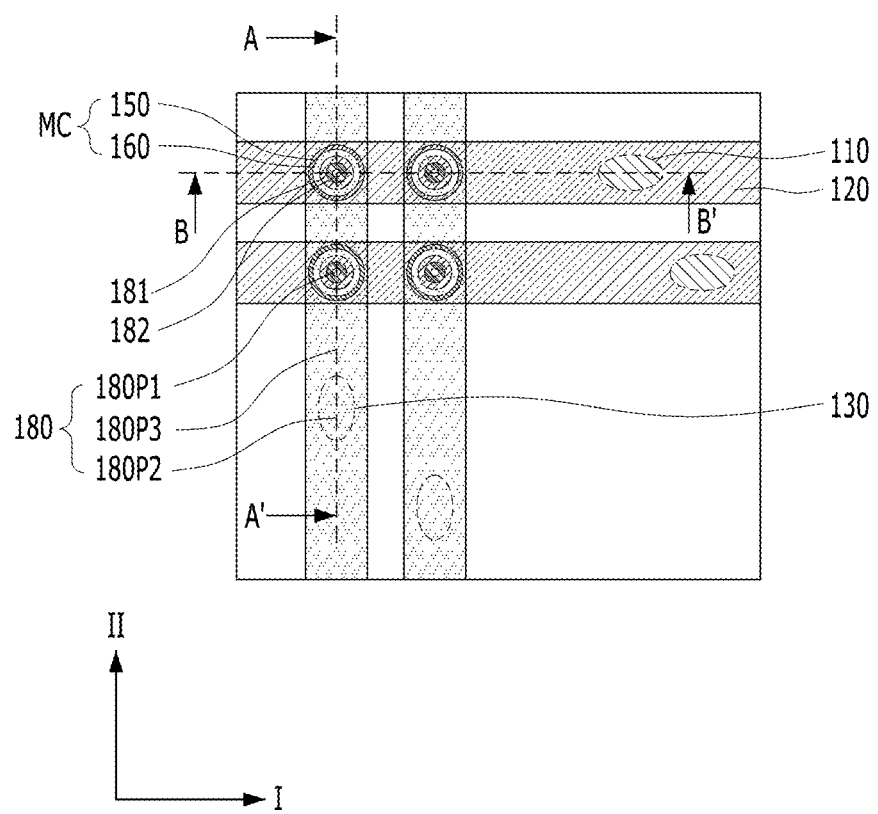
FIGS. 1A, 1B, and 1C are diagrams for describing a semiconductor device according to an embodiment of the present disclosure.
Figure 1B:
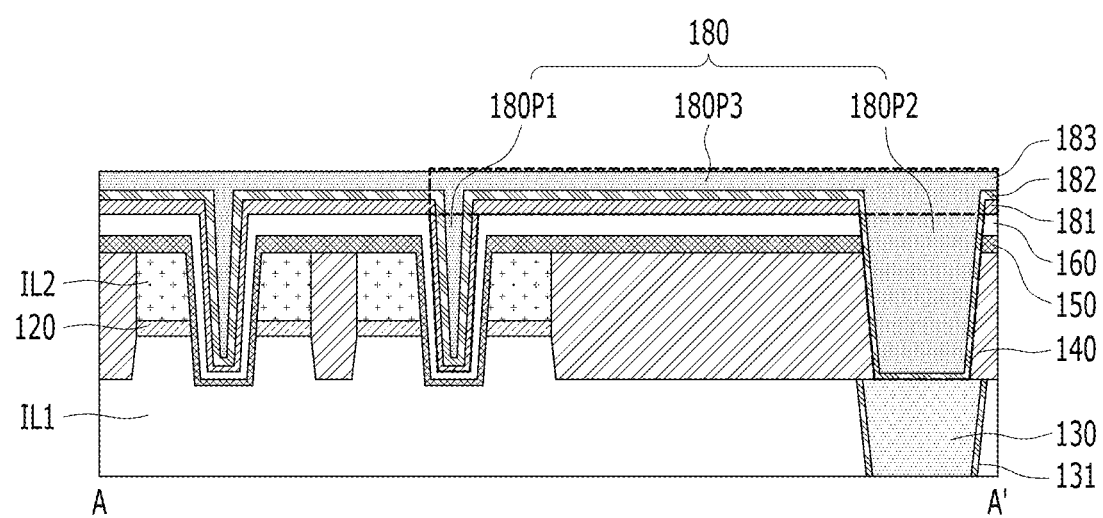
Figure 1C:
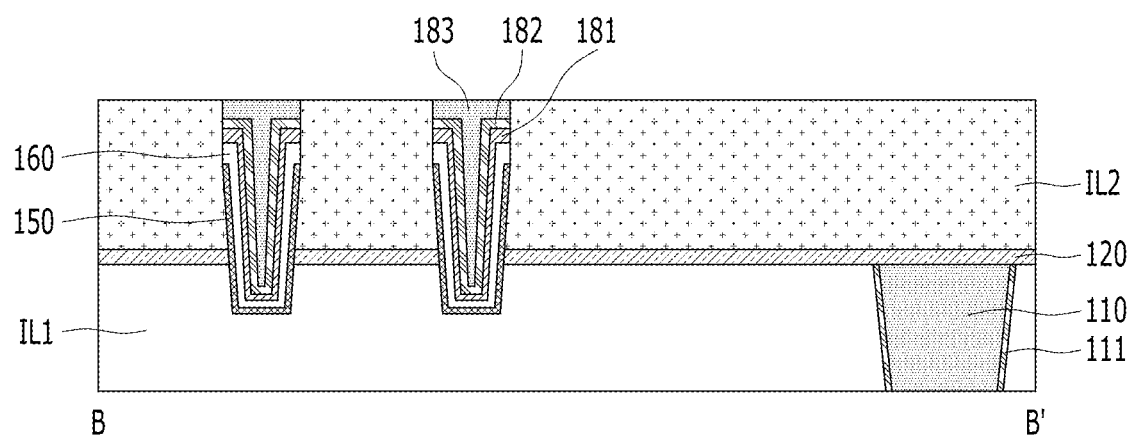

FIGS. 1A to 1C are diagrams for describing a semiconductor device according to an embodiment of the present disclosure. FIG. 1A may be a plan view of the semiconductor device. FIG. 1B may be a cross-sectional view taken along line A-A' in FIG. 1A. FIG. 1C may be a cross-sectional view taken along line B-B' in FIG. 1A.

Referring to FIGS. 1A to 1C, the semiconductor device may include one or more of a word line 120, a bit line 180, and memory cells MC. The semiconductor device may further include one or more of a first contact plug 110, a second contact plug 130, a separation insulating layer 140, a first interlayer insulating layer IL1, and a second interlayer insulating layer IL2. The bit line 180 may include one or more of a first conductive layer 181, a barrier layer 182, and a second conductive layer 183.

The word lines 120 may be disposed on the first contact plug 110, and may extend in a first direction I. The word lines 120 may be spaced apart from each other and arranged in a second direction II that intersects the first direction I. Each of the word lines 120 may be electrically connected to the first contact plug 110.

The first contact plug 110 may be disposed within the first interlayer insulating layer IL1. The sidewall of the first contact plug 110 may be surrounded by a barrier layer 111. The first interlayer insulating layer IL1 may be disposed below the word lines 120. The second contact plug 130 may be disposed within the first interlayer insulating layer IL1. The second interlayer insulating layer IL2 may be disposed on the word lines 120. The first contact plug 110 and the second contact plug 130 may include a conductive material, such as tungsten or titanium. In this case, the first interlayer insulating layer IL1 and the second interlayer insulating layer IL2 may be a multi-layer. The first interlayer insulating layer IL1 and the second interlayer insulating layer IL2 may include an insulating material, such as oxide or nitride.

The separation insulating layer 140 may be disposed on the second contact plug 130. The separation insulating layers 140 may be disposed within the first interlayer insulating layer IL1 and the second interlayer insulating layer IL2. The separation insulating layer 140 may separate the word lines 120 that extend in the first direction I from each other. The separation insulating layer 140 may include an insulating material, such as oxide or nitride. For example, the separation insulating layer 140 may include tetra ethyl ortho silicate (TEOS) oxide.

The memory cell MC may include a variable resistance layer 150. For example, the memory cell MC may include a portion of the variable resistance layer 150 disposed therein. The memory cell MC may further include an electrode layer 160. The memory cell MC may be disposed between the word line 120 and the bit line 180. The memory cell MC may be disposed within the first interlayer insulating layer IL1 and the second interlayer insulating layer IL2. For example, the memory cell MC may protrude into the first interlayer insulating layer IL1. The memory cells MC that are adjacent to each other in the second direction II may be connected. For example, the variable resistance layers 150 and electrode layers 160 of the respective memory cells MC may extend in the second direction II, and may be connected.

The variable resistance layer 150 may be disposed to come into contact with the word line 120, or an electrode layer may be additionally disposed between the variable resistance layer 150 and the word line 120. The variable resistance layer 150 may be a switching material or a phase change material. For example, the variable resistance layer 150 may include a chalcogenide material. The electrode layer 160 may be disposed within the variable resistance layer 150. The electrode layer 160 may include metal, metal nitride, carbon, or carbon nitride.

The bit lines 180 may be disposed over the word lines 120. The bit lines 180 may extend in the second direction II. Each of the bit lines 180 may include a first protruding part 180P1, a second protruding part 180P2, and a connection part 180P3 that connects the first protruding part 180P1 and the second protruding part 180P2 and that extends in the second direction II. For example, the bit line 180 may include the first protruding part 180P1 that protrudes into the variable resistance layer 150, the second protruding part 180P2 that is connected to the second contact plug 130, and the connection part 180P3.

The first protruding part 180P1 may protrude into the memory cell MC. The first protruding part 180P1 may protrude into the variable resistance layer 150. The first protruding part 180P1 may extend through the word line 120, and may play a role as a vertical bit line that intersects the word line 120. The sidewall and bottom of the first protruding part 180P1 may be surrounded by the variable resistance layer 150. The first protruding part 180P1 may include a first conductive layer 181, a barrier layer 182 within the first conductive layer 181, and a second conductive layer 183 within the barrier layer 182. For example, the first protruding part 180P1 may include a first portion of the first conductive layer 181 disposed within the memory cell MC, a first portion of the barrier layer 182 disposed within the first portion of the first conductive layer 181, and a first portion of the second conductive layer 183 disposed within the first portion of the barrier layer 182. The electrode layer 160 may be disposed between the first protruding part 180P1 and the variable resistance layer 150. The first conductive layer 181 and the second conductive layer 183 may each include a conductive material, such as tungsten or titanium. The barrier layer 182 may include metal nitride, such as tungsten nitride (WN) or titanium nitride (TIN). The barrier layer 182 can increase adhesive strength between the first conductive layer 181 and the second conductive layer 183.

The second protruding part 180P2 may extend through the separation insulating layer 140, and may be electrically connected to the second contact plug 130. The second protruding part 180P2 may include the barrier layer 182 and the second conductive layer 183 within the barrier layer 182. For example, the second protruding part 180P2 may include a second portion of the barrier layer 182 protruding into the electrode layer 160, the variable resistance layer 150, and the separation insulating layer 140. The second protruding part 180P2 may further include a second portion of the second conductive layer 183 disposed within the second portion of the barrier layer 182. The second protruding part 180P2 may play a role as a contact plug that connects the connection part 180P3 and the second contact plug 130.

The connection part 180P3 may include the first conductive layer 181, the barrier layer 182 on the first conductive layer 181, and the second conductive layer 183 on the barrier layer 182. For example, the connection part 180P3 may include a second portion of the first conductive layer 181, a third portion of the barrier layer 182 disposed on the second portion of the first conductive layer 181, and a third portion of the second conductive layer 183 disposed on the third portion of the barrier layer 182.

The first protruding part 180P1, the second protruding part 180P2, and the connection part 180P3 may be formed by using the same process. The first conductive layer 181 of the first protruding part 180P1 and the first conductive layer 181 of the connection part 180P3 may be a single layer. For example, the first portion of the first conductive layer 181 in the first protruding part 180P1 and the second portion of the first conductive layer 181 in the connection part 180P3 may be formed as portions of a single layer using the same process. The barrier layer 182 of the first protruding part 180P1, the barrier layer 182 of the second protruding part 180P2, and the barrier layer 182 of the connection part 180P3 may be a single layer. For example, the first portion of the barrier layer 182 in the first protruding part 180P1, the second portion of the barrier layer 182 in the second protruding part 180P2, and the third portion of the barrier layer 182 in the connection part 180P3 may be formed as portions of a single layer using the same process. The second conductive layer 183 of the first protruding part 180P1, the second conductive layer 183 of the second protruding part 180P2, and the second conductive layer 183 of the connection part 180P3 may be a single layer. For example, the first portion of the second conductive layer 183 in the first protruding part 180P1, the second portion of the second conductive layer 183 in the second protruding part 180P2, and the third portion of the second conductive layer 183 in the connection part 180P3 may be formed as portions of a single layer using the same process.

According to the aforementioned structure, the bit line 180 may include the first protruding part 180P1, the second protruding part 180P2, and the connection part 180P3 that connects the first protruding part 180P1 and the second protruding part 180P2.

FIGS. 2A to 2C, 3A to 3C, 4A to 4C, 5A to 5C, 6A to 6C, and 7A to 7C are diagrams for describing a method of manufacturing a semiconductor device according to an embodiment of the present disclosure. FIGS. 2A, 3A, 4A, 5A, 6A, and 7A may be plan views of the semiconductor device. FIGS. 2B, 3B, 4B, 5B, 6B, and 7B may be cross-sectional views taken along line A-A' in FIG. 2A. FIGS. 2C, 3C, 4C, 5C, 6C, and 7C may be cross-sectional views taken along line B-B' in FIG. 2A. Hereinafter, contents that are redundant with the aforementioned contents may be omitted for the interest of brevity.

Figure 2A:
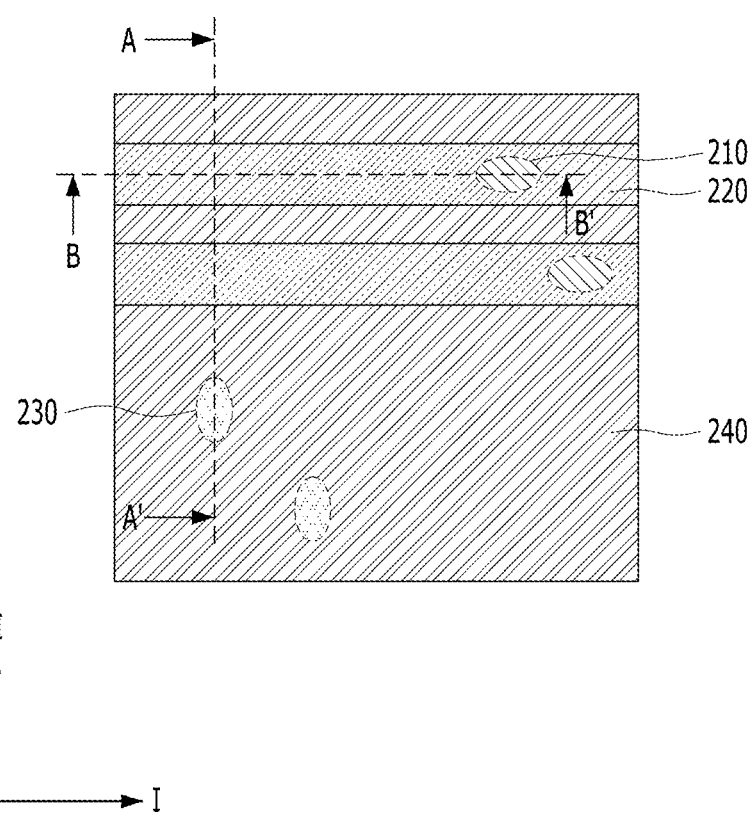
FIGS. 2A, 2B, 2C, 3A, 3B, 3C, 4A, 4B, 4C, 5A, 5B, 5C, 6A, 6B, 6C, 7A, 7B, and 7C are diagrams for describing a method of manufacturing a semiconductor device according to an embodiment of the present disclosure.
Figure 2B:
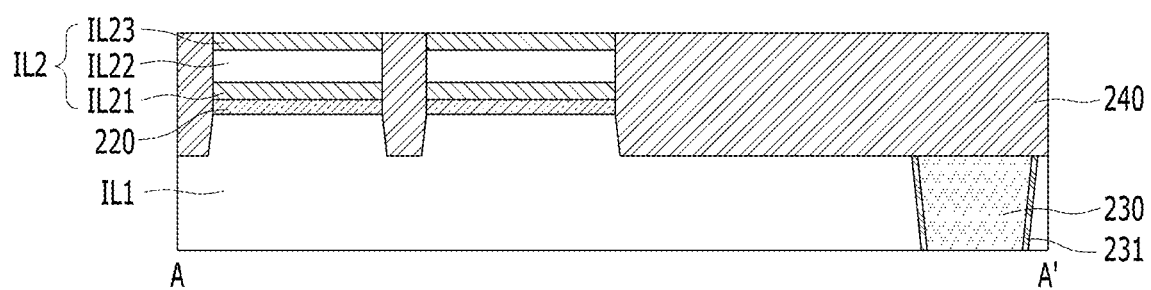
Figure 2C:
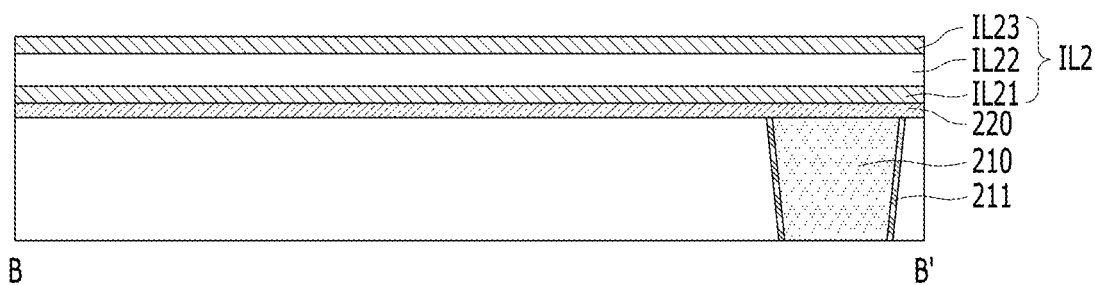

Referring to FIGS. 2A to 2C, a first contact plug 210 may be formed. The first contact plug 210 may be formed within a first interlayer insulating layer IL1. A barrier layer 211 may be formed on the sidewall of the first contact plug 210. The first contact plug 210 may include a conductive material, such as tungsten or titanium.

A second contact plug 230 may be formed. The second contact plug 230 may be formed within the first interlayer insulating layer IL1. When the first contact plug 210 is formed, the second contact plug 230 may be formed. The second contact plug 230 may include a conductive material, such as tungsten or titanium.

Next, a word line 220 may be formed on the first interlayer insulating layer IL1. The word line 220 may be connected to the first contact plug 210 and may extend in a first direction I.

Next, a second interlayer insulating layer IL2 may be formed. The second interlayer insulating layer IL2 may be a single layer or a multi-layer. For example, the second interlayer insulating layer IL2 may be formed by sequentially stacking a first insulating layer IL21, a second insulating layer IL22, and a third insulating layer IL23. The second interlayer insulating layer IL2 may include an insulating material, such as oxide or nitride. For example, the first insulating layer IL21 may include nitride, the second insulating layer IL22 may include tetra ethyl ortho silicate (TEOS) oxide, and the third insulating layer IL23 may include nitride.

Next, a separation insulating layer 240 may be formed. For example, a trench may be formed by etching the second interlayer insulating layer IL2 and a conductive layer for a word line. The separation insulating layer 240 may be formed within the trench. Accordingly, the word line 220 may be formed. The word line 220 may be connected to the first contact plug 210, and may extend in the first direction I.

The separation insulating layer 240 may be disposed on the second contact plug 230. The separation insulating layer 240 may be disposed within the second interlayer insulating layer IL2 and the word line 220, and may extend into the first interlayer insulating layer IL1. The separation insulating layer 240 may separate the word lines 220 that extend in the first direction I from each other. The separation insulating layer 240 may include an insulating material, such as oxide or nitride. For example, the separation insulating layer 240 may include TEOS oxide.

Figure 3A:
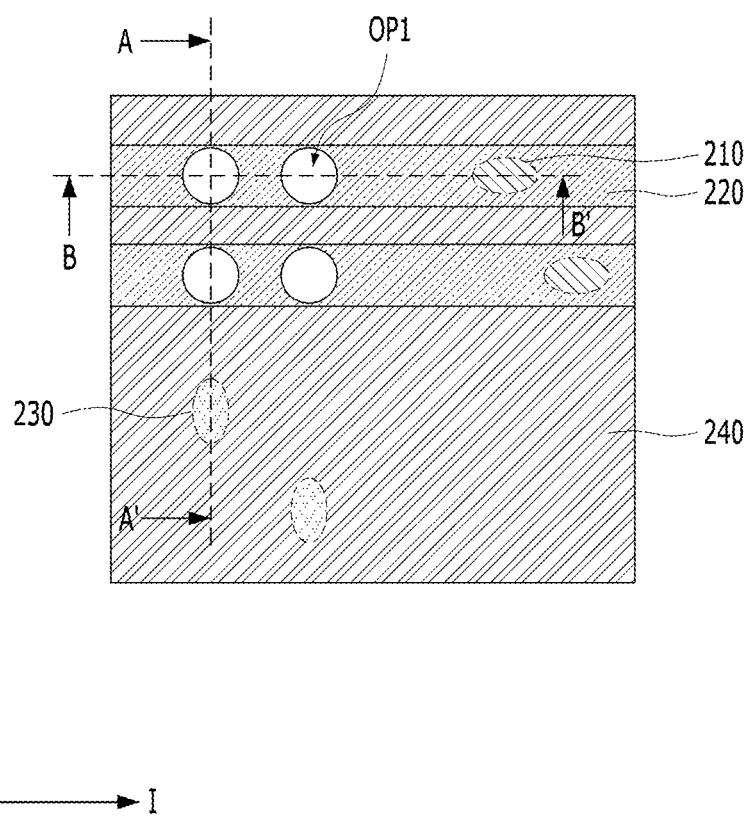
Figure 3B:
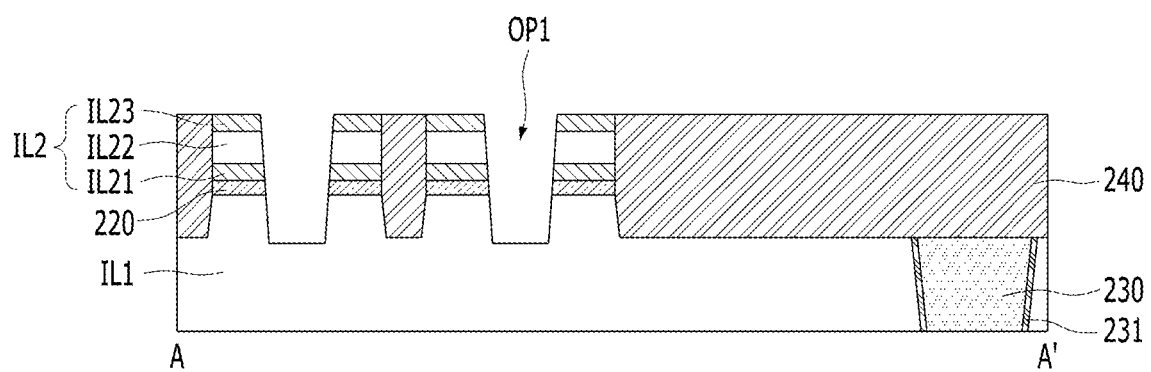
Figure 3C:
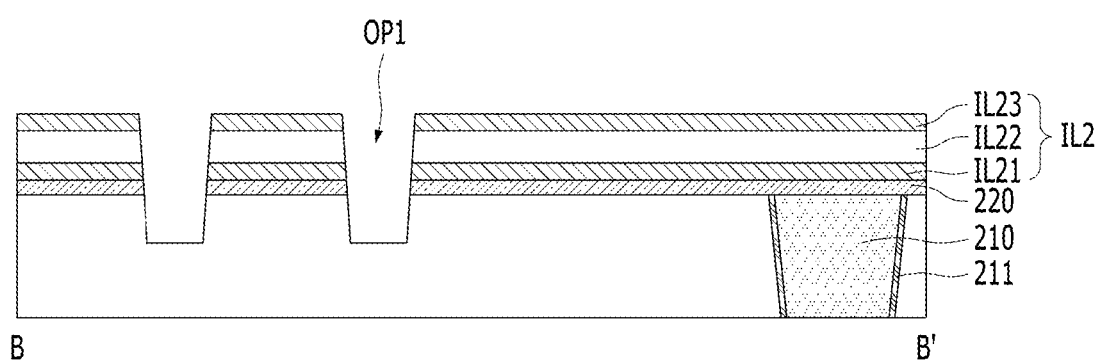

Referring to FIGS. 3A to 3C, a first opening OP1 may be formed within the word line 220. The first opening OP1 may be formed within the second interlayer insulating layer IL2 and the word line 220, and may extend into the first interlayer insulating layer IL1 through the word line 220. The first opening OP1 may be disposed between the separation insulating layers 240 that are adjacent to each other in a second direction II that intersects a first direction I.

Figure 4A:
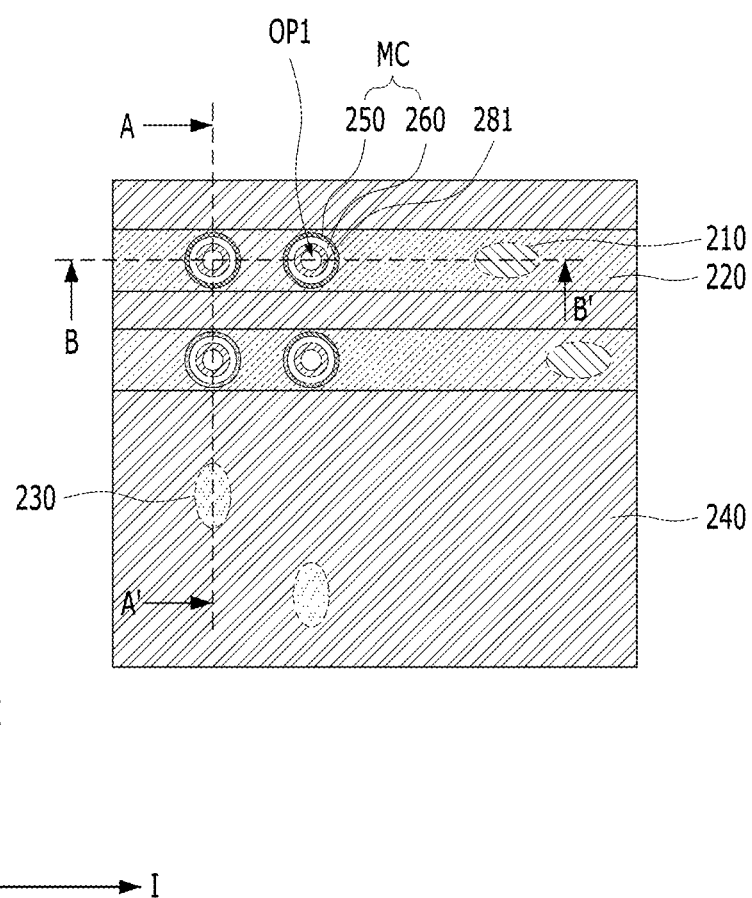
Figure 4B:
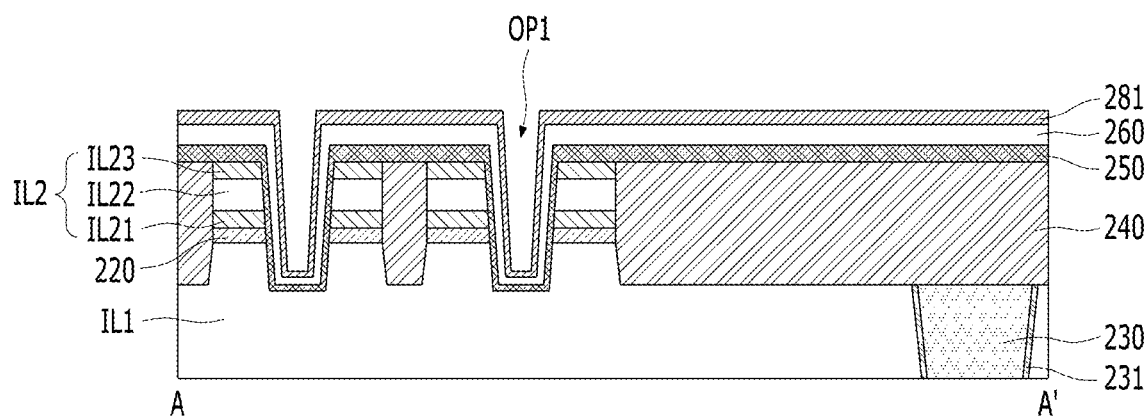
Figure 4C:
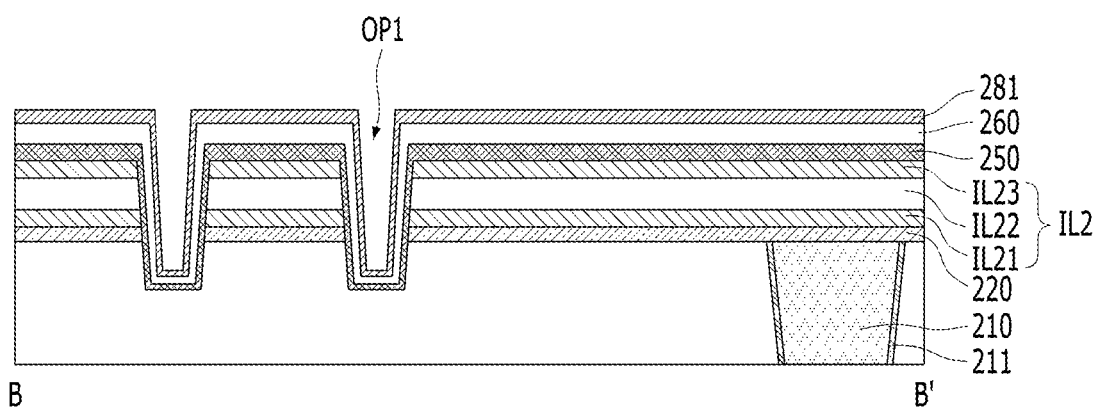

Referring to FIGS. 4A to 4C, a memory cell MC may be formed. The memory cell MC may include a variable resistance layer 250. The memory cell MC may further include an electrode layer 260. First, the variable resistance layer 250 may be formed within the first opening OP1. The variable resistance layer 250 may be formed along the inner side of the first opening OP1 so that the first opening OP1 is partially opened. For example, the variable resistance layer 250 may be formed along the inner side of the first opening OP1 with a thickness sufficient to partially fill the first opening OP1, rather than substantially completely filling the first opening OP1. The variable resistance layer 250 may include a chalcogenide material. Next, the electrode layer 260 may be formed within the variable resistance layer 250. The electrode layer 260 may be formed along the inner side of the variable resistance layer 250 so that the first opening OP1 is partially opened. The electrode layer 260 may include metal, metal nitride, carbon, or carbon nitride. Accordingly, the memory cell MC that includes the variable resistance layer 250 and the electrode layer 260 may be formed. For example, the memory cell MC includes a portion of the variable resistance layer 250 disposed within the first opening OP1 and a portion of the electrode layer 260 disposed within the portion of the variable resistance layer 250.

Next, a first conductive layer 281 may be formed within the first opening OP1. The first conductive layer 281 may be formed along the inner side of the first opening OP1 so that the first opening OP1 is partially opened. Specifically, the first conductive layer 281 may be formed along the inner side of the first opening OP1 with a thickness sufficient to partially fill the first opening OP1, rather than substantially completely filling the first opening OP1. For example, the first conductive layer 281 may be formed along the electrode layer 260 within the first opening OP1. The first conductive layer 281 may be a multi-layer. For example, the first conductive layer 281 may include a barrier layer and a metal layer. In this case, the barrier layer can increase adhesive strength between the electrode layer 260 and the first conductive layer 281. The first conductive layer 281 may include a conductive material (e.g., tungsten or titanium), or metal nitride (e.g., tungsten nitride (WN) or titanium nitride (TiN)), or both.

Although the memory cell MC and the first conductive layer 281 are formed, additional structures may be formed within the first opening OP1 in a subsequent process because the state in which the first opening OP1 has been opened is maintained.

Figure 5A:
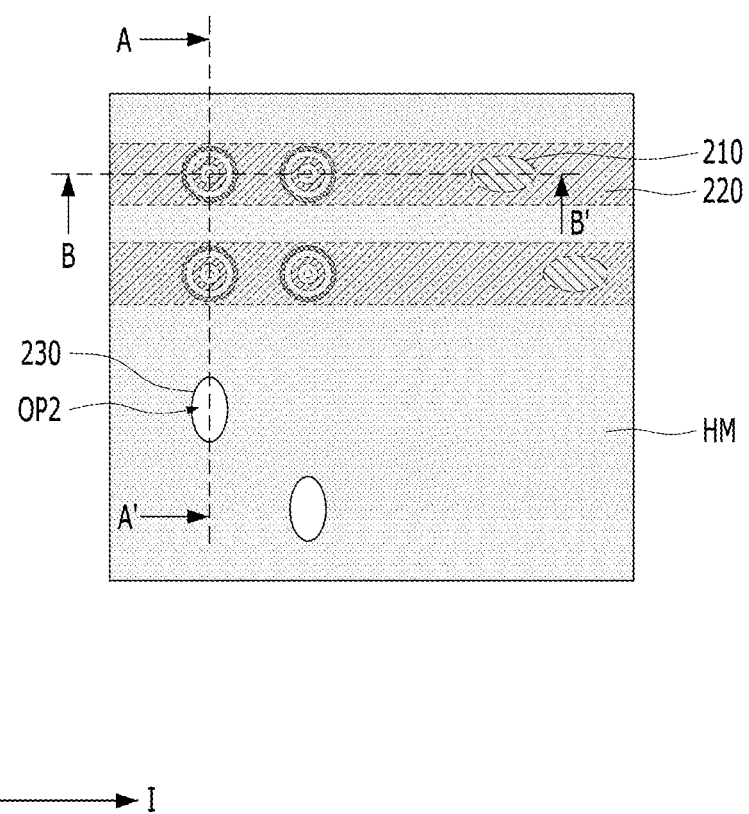
Figure 5B:
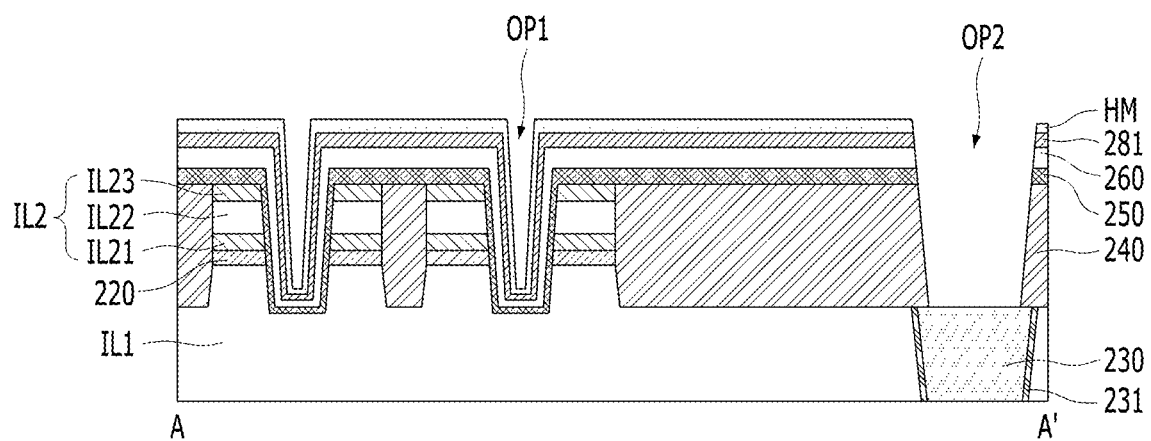
Figure 5C:
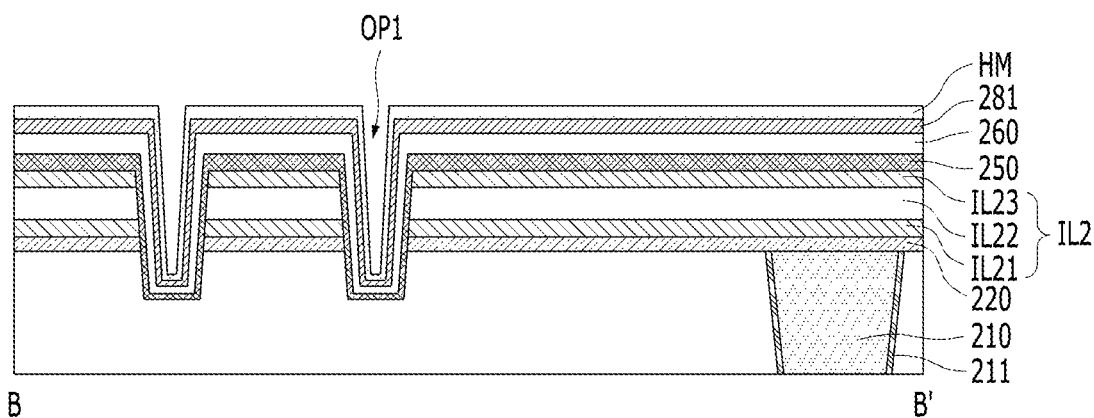

Referring to FIGS. 5A to 5C, a second opening OP2 may be formed. First, a hard mask HM may be formed on the first conductive layer 281. Next, the second opening OP2 may be formed by etching the first conductive layer 281, the memory cell MC, and the separation insulating layer 240 by using the hard mask HM as an etch barrier. The second opening OP2 may expose the second contact plug 230 through the separation insulating layer 240. The second opening OP2 may be formed in the state in which the first opening OP1 has been at least partially opened. In other words, the hard mask HM may be formed along the inner side of the first conductive layer 281 so that the first opening OP1 is partially filled. For example, each of portions of the variable resistance layer 250, the electrode layer 260, the first conductive layer 281, and the hard mask HM that are disposed within the first opening OP1 has a thickness sufficient to partially fill the first opening OP1, rather than substantially completely filling the first opening OP1. The hard mask HM may be removed after the second opening OP2 is formed. The hard mask HM may partially remain within the first opening OP1 without being removed. In the process of removing the hard mask HM, a part of the first conductive layer 281 may be removed, but the variable resistance layer 250 might not be exposed. Accordingly, the first conductive layer 281 can prevent the variable resistance layer 250 from being damaged or can minimize damage to the variable resistance layer 250.

Although the hard mask HM is formed, the state in which the first opening OP1 has been opened may be maintained. The first opening OP1 is enlarged by removing the hard mask HM after the second opening OP2 is formed. Accordingly, in a subsequent process, a second conductive layer can be formed within the first opening OP1 and the second opening OP2.

Figure 6A:
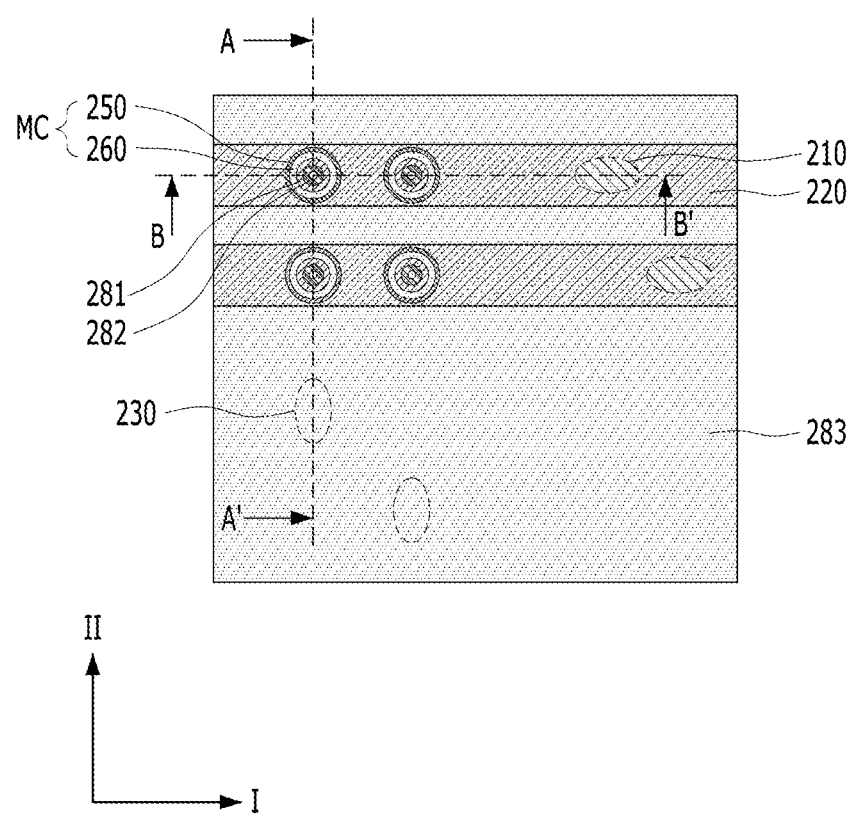
Figure 6B:
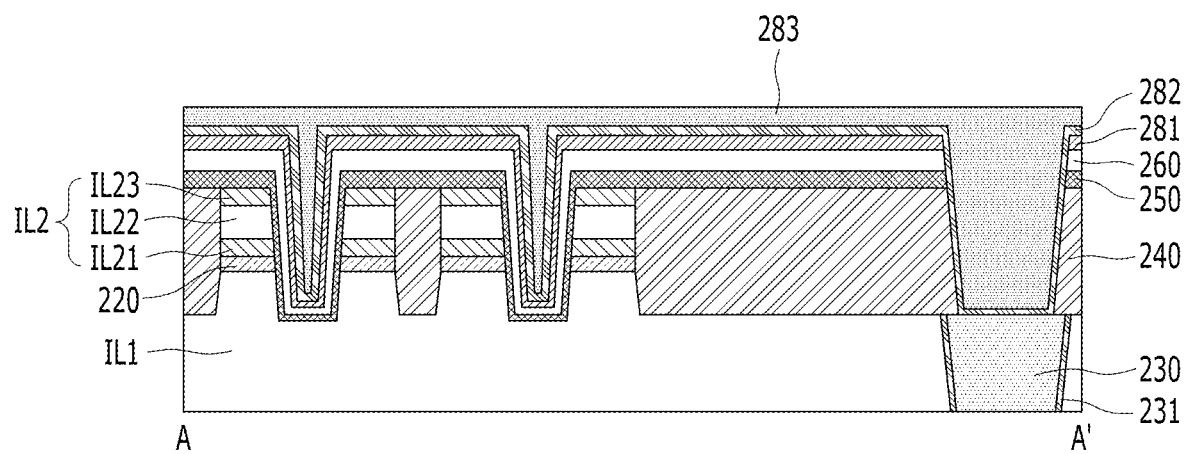
Figure 6C:
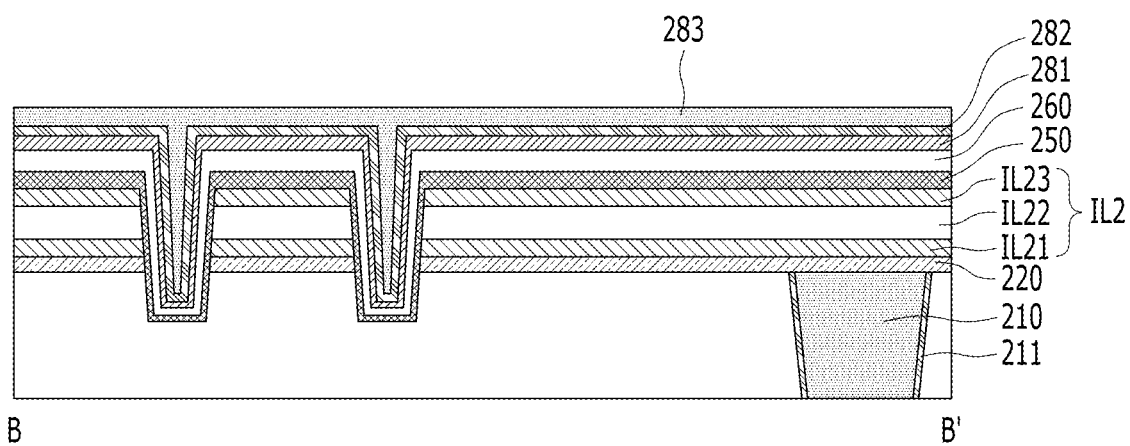

Referring to FIGS. 6A to 6C, a second conductive layer 283 may be formed. The second conductive layer 283 may be formed along the inner sides of the first opening OP1 and the second opening OP2. In this case, the first opening OP1 and the second opening OP2 may be substantially completely filled with the second conductive layer 283 so that an opened area is not substantially present. Accordingly, the second conductive layer 283 may protrude into the memory cell MC, and may protrude into the separation insulating layer 240 through the word line 220.

Before the second conductive layer 283 is formed, a barrier layer 282 may be formed. The barrier layer 282 may be formed between the first conductive layer 281 and the second conductive layer 283, and can increase adhesive strength between the first conductive layer 281 and the second conductive layer 283. The barrier layer 282 may include metal nitride, such as tungsten nitride (WN) or titanium nitride (TiN).

Figure 7A:
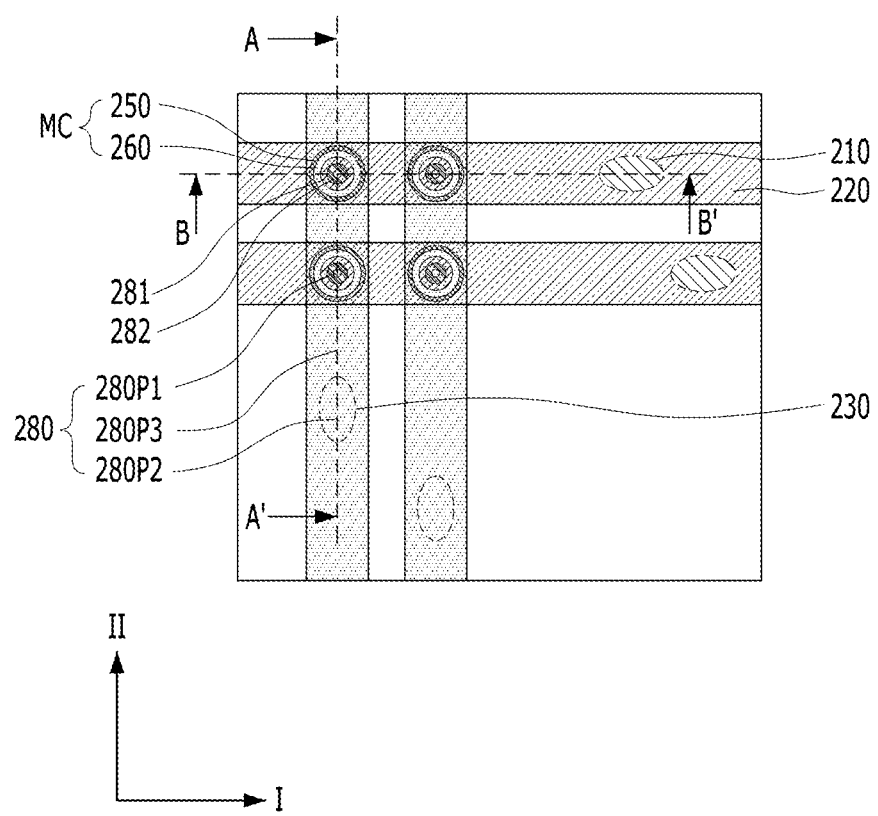
Figure 7B:
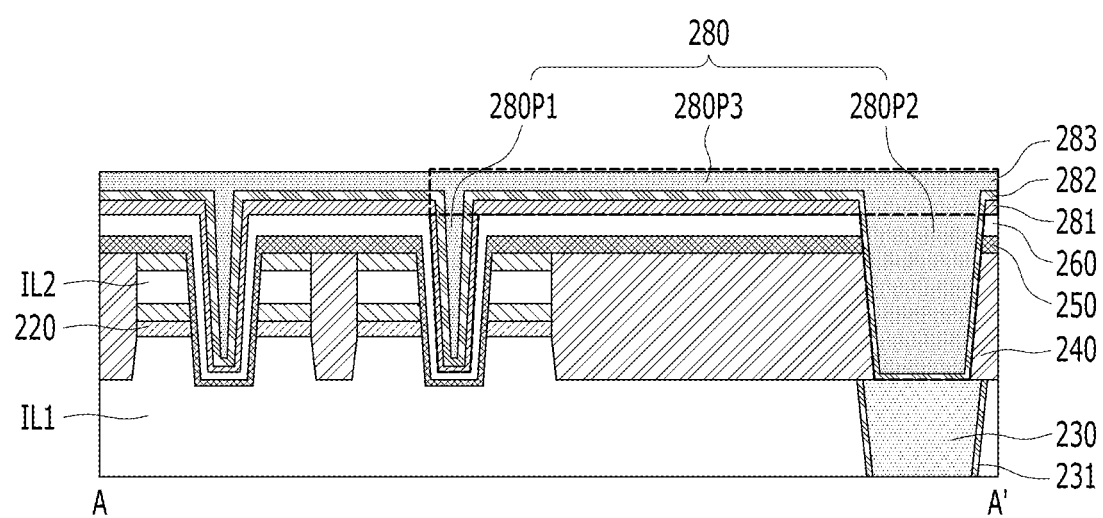
Figure 7C:
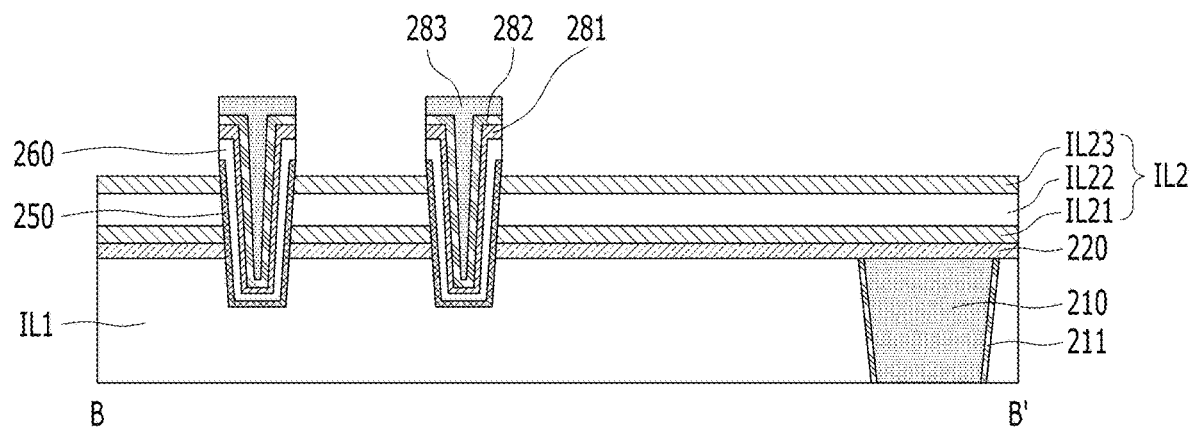

Referring to FIGS. 7A to 7C, a bit line 280 that extends in a second direction II may be formed. For example, the bit lines 280 may be formed by patterning the second conductive layer 283, the barrier layer 282, and the first conductive layer 281. The bit line 280, including a first protruding part 280P1, a second protruding part 280P2, and a connection part 280P3 that connects the first protruding part 280P1 and the second protruding part 280P2 and that extends in the second direction II, may be formed.

In this case, the first protruding part 280P1 may include a first conductive layer 281, a barrier layer 282 within the first conductive layer 281, and a second conductive layer 283 within the barrier layer 282. The electrode layer 260 may be disposed between the first protruding part 280P1 and the variable resistance layer 250. The first conductive layer 281 and the second conductive layer 283 may each include a conductive material, such as tungsten or titanium. The barrier layer 282 may include metal nitride, such as tungsten nitride (WN) or titanium nitride (TiN). The barrier layer 282 can increase adhesive strength between the first conductive layer 281 and the second conductive layer 283.

The second protruding part 280P2 may extend through the separation insulating layer 240, and may be electrically connected to the second contact plug 230. The second protruding part 280P2 may include the barrier layer 282 and the second conductive layer 283 within the barrier layer 282. The second protruding part 280P2 may play a role as a contact plug that connects the connection part 280P3 and the second contact plug 230.

The connection part 280P3 may include the first conductive layer 281, the barrier layer 282 on the first conductive layer 281, and the second conductive layer 283 on the barrier layer 282.

According to the aforementioned process, in depositing the conductive layers for forming the bit line 280, the conductive layers may be divided and deposited plural times. For example, the bit line 280 includes the first conductive layer 281, the barrier layer 282, and the second conductive layer 283, each of which may be formed in a separate deposition process. Accordingly, the variable resistance layer 250 under the conductive layers can be prevented from being damaged, such as being peeled, when the conductive layers are patterned, or damage to the variable resistance layer 250 when the conductive layers are patterned can be minimized. For example, since the second opening OP2 is formed after the first conductive layer 281 is formed, damage to the variable resistance layer 250 in the process of etching the first conductive layer 281 can be reduced. Furthermore, since the bit line 280 is formed by patterning the second conductive layer 283, the barrier layer 282, and the first conductive layer 281, a planarization process may be omitted to form the bit line 280 and damage to the variable resistance layer 250 can be reduced compared to a case in which such a planarization process is used.

Figure 8A:
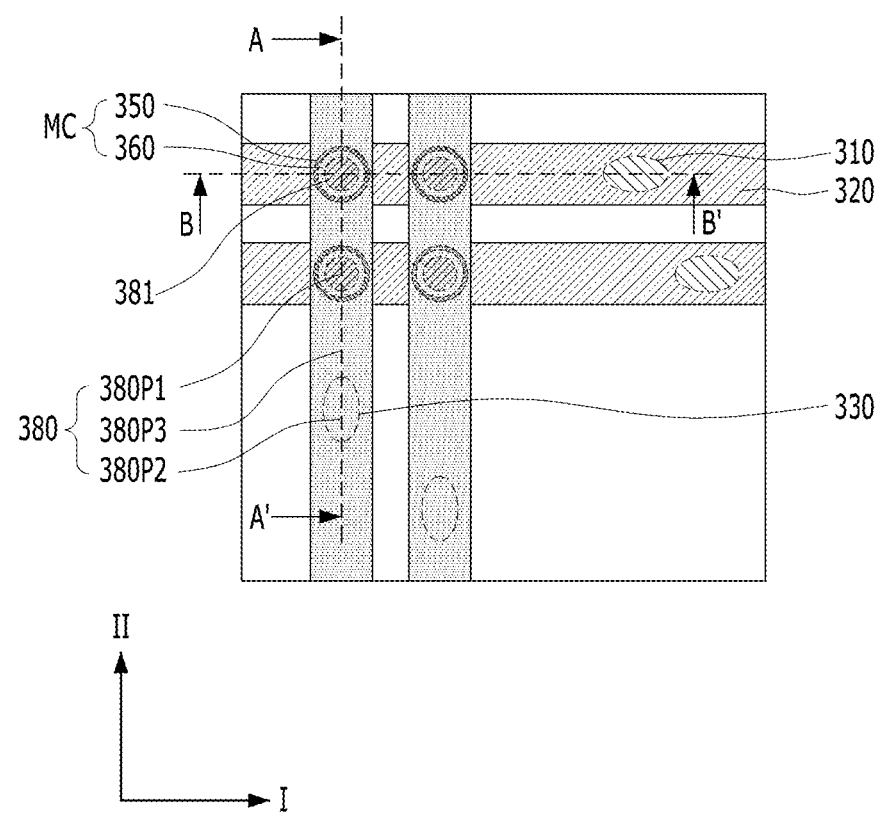
FIGS. 8A, 8B, and 8C are diagrams for describing a semiconductor device according to an embodiment of the present disclosure.
Figure 8B:
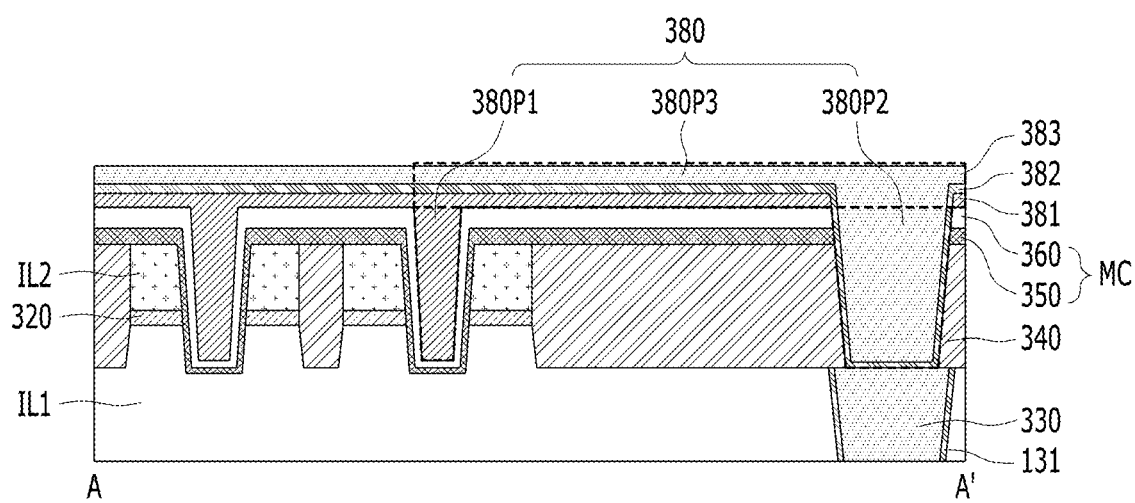
Figure 8C:
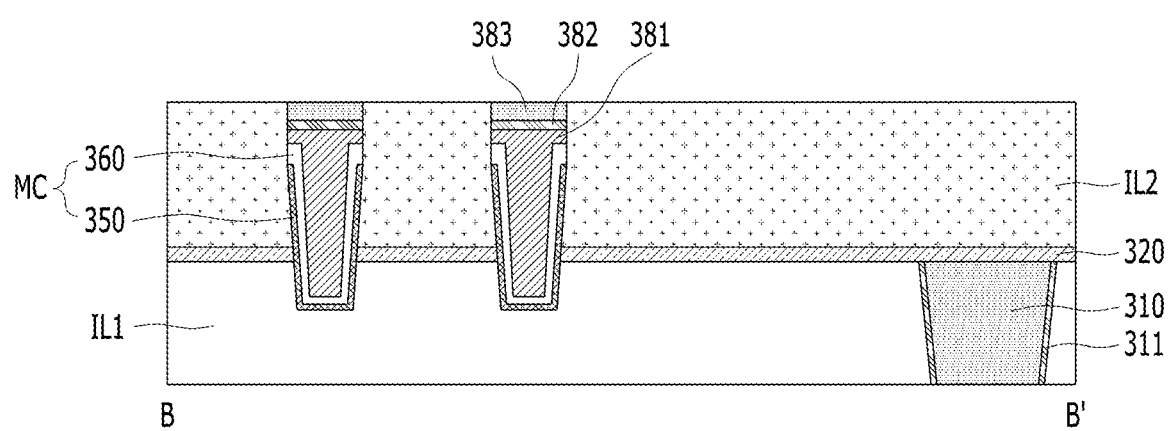

FIGS. 8A to 8C are diagrams for describing a semiconductor device according to an embodiment of the present disclosure. FIG. 8A may be a plan view of the semiconductor device. FIG. 8B may be a cross-sectional view taken along line A-A' in FIG. 8A. FIG. 8C may be a cross-sectional view taken along line B-B' in FIG. 8A. Hereinafter, contents that are redundant with the aforementioned contents may be omitted for the interest of brevity.

Referring to FIGS. 8A to 8C, a semiconductor device may include one or more of a word line 320, a bit line 380, and memory cells MC. The semiconductor device may further include one or more of a first contact plug 310, a second contact plug 330, a separation insulating layer 340, a first interlayer insulating layer IL1, and a second interlayer insulating layer IL2. The bit line 380 may include one or more of a first conductive layer 381, a barrier layer 382, and a second conductive layer 383.

The word lines 320 may be disposed on the first contact plug 310, and may extend in a first direction I. The word lines 320 may be spaced apart from each other and disposed in a second direction II that intersects the first direction I. Each of the word lines 320 may be electrically connected to the first contact plug 310.

The first contact plug 310 may be disposed within the first interlayer insulating layer IL1. The sidewall of the first contact plug 310 may be surrounded by a barrier layer 311. The first interlayer insulating layer IL1 may be disposed below the word lines 320. The second contact plug 330 may be disposed within the first interlayer insulating layer IL1. The second interlayer insulating layer IL2 may be disposed on the word lines 320. In this case, the first interlayer insulating layer IL1 and the second interlayer insulating layer IL2 may be a single layer or a multi-layer.

The separation insulating layer 340 may be disposed on the second contact plug 330. The separation insulating layer 340 may be disposed within the first interlayer insulating layer IL1 and the second interlayer insulating layer IL2. The separation insulating layer 340 may separate the word lines 320 that extend in the first direction I from each other.

The memory cell MC may include a variable resistance layer 350. The memory cell MC may further include an electrode layer 360. The memory cell MC may be disposed between the word line 320 and the bit line 380. The memory cell MC may be disposed within the first interlayer insulating layer IL1 and the second interlayer insulating layer IL2. For example, the memory cell MC may protrude into the first interlayer insulating layer IL1.

The variable resistance layer 350 may be disposed to come into contact with the word line 320, or an electrode layer may be additionally disposed between the variable resistance layer 350 and the word line 320. The electrode layer 360 may be disposed within the variable resistance layer 350.

The bit lines 380 may be disposed over the word lines 320. The bit lines 380 may extend in a second direction II. Each of the bit lines 380 may include a first protruding part 380P1, a second protruding part 380P2, and a connection part 380P3 that connects the first protruding part 380P1 and the second protruding part 380P2 and that extends in the second direction II.

The first protruding part 380P1 may protrude into the memory cell MC. The first protruding part 380P1 may protrude into the variable resistance layer 350. The first protruding part 380P1 may extend through the word line 320, and may play a role as a vertical bit line that intersects the word line 320. The sidewall and bottom of the first protruding part 380P1 may be surrounded by the variable resistance layer 350. The first protruding part 380P1 may include the first conductive layer 381 that protrudes into the variable resistance layer 350. For example, the first protruding part 380P1 may include a first portion of the first conductive layer 381 protruding into the memory cell MC. The electrode layer 360 may be disposed between the first protruding part 380P1 and the variable resistance layer 350.

The second protruding part 380P2 may extend through the separation insulating layer 340, and may be electrically connected to the second contact plug 330. The second protruding part 380P2 may include the barrier layer 382 and the second conductive layer 383 within the barrier layer 382. For example, the second protruding part 380P2 may include a first portion of the barrier layer 382 protruding into the electrode layer 360, the variable resistance layer 350, and the separation insulating layer 340. The second protruding part 380P2 may further include a first portion of the second conductive layer 383 disposed within the first portion of the barrier layer 382. The second protruding part 380P2 may play a role as a contact plug that connects the connection part 380P3 and the second contact plug 330.

The connection part 380P3 may include the first conductive layer 381, the barrier layer 382 on the first conductive layer 381, and the second conductive layer 383 on the barrier layer 382. For example, the connection part 380P3 may include a second portion of the first conductive layer 381, a second portion of the barrier layer 382 disposed on the second portion of the first conductive layer 381, and a second portion of the second conductive layer 383 disposed on the second portion of the barrier layer 382. The first protruding part 380P1, the second protruding part 380P2, and the connection part 380P3 may be formed by using the same process. For example, the first portion of the second conductive layer 383 in the second protruding part 380P2 and the second portion of the second conductive layer 383 in the connection part 380P3 may be formed using the same process.

According to the aforementioned structure, the first protruding part 380P1 of the bit line 380 may include the first conductive layer 381. The first conductive layer 381 may protrude into the variable resistance layer 350.

FIGS. 9A to 9C, 10A to 10C, 11A to 11C, and 12A to 12C are diagrams for describing a method of manufacturing a semiconductor device according to an embodiment of the present disclosure. FIGS. 9A, 10A, 11A, and 12A may be plan views of the semiconductor device. FIGS. 9B, 10B, 11B, and 12B may be cross-sectional views taken along line A-A' in FIG. 9A. FIGS. 9C, 10C, 11C, and 12C may be cross-sectional views taken along line B-B' in FIG. 9A. Hereinafter, contents that are redundant with the aforementioned contents may be omitted for the interest of brevity.

Figure 9A:
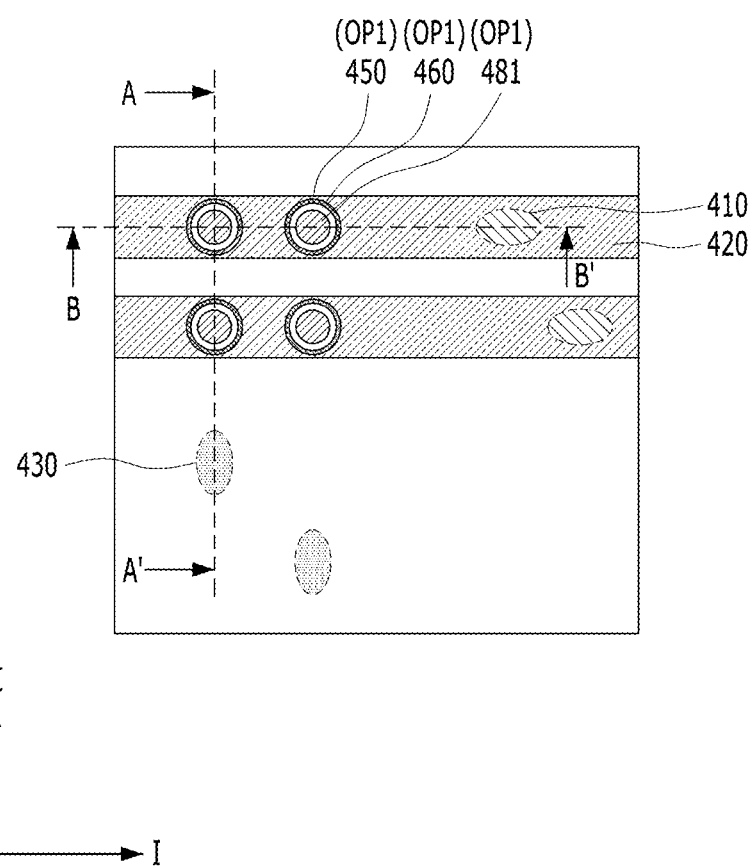
FIGS. 9A, 9B, 9C, 10A, 10B, 10C, 11A, 11B, 11C, 12A, 12B, and 12C are diagrams for describing a method of manufacturing a semiconductor device according to an embodiment of the present disclosure.
Figure 9B:
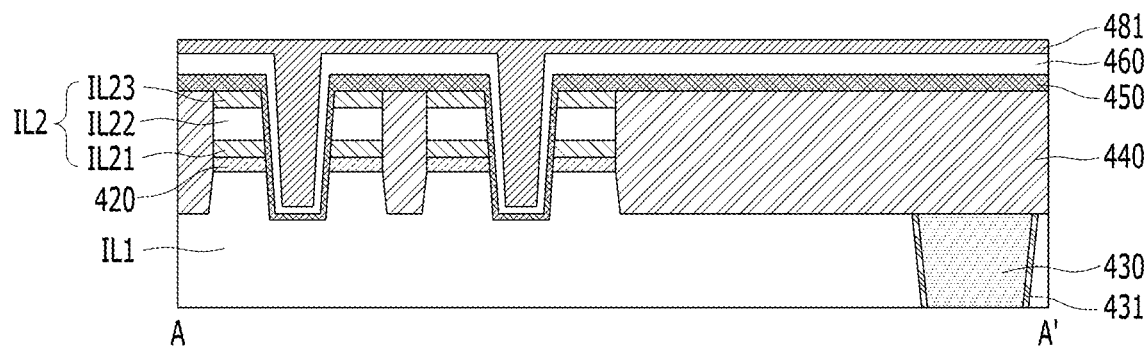
Figure 9C:
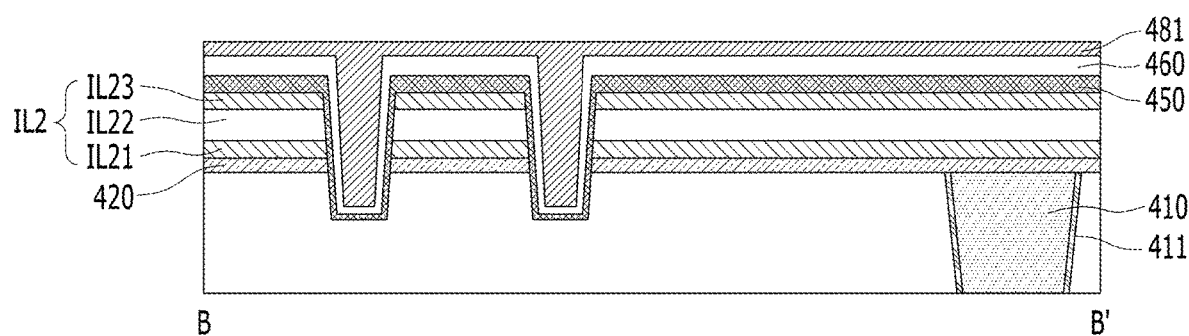

Referring to FIGS. 9A to 9C, a first contact plug 410 may be formed within a first interlayer insulating layer IL1. When the first contact plug 410 is formed, a second contact plug 430 may be formed within the first interlayer insulating layer IL1.

Next, a word line 420 that is connected to the first contact plug 410 may be formed on the first interlayer insulating layer IL1. Next, the second interlayer insulating layer IL2 may be formed on the word line 420. The second interlayer insulating layer IL2 may be a single layer or a multi-layer. For example, the second interlayer insulating layer IL2 may be formed by sequentially stacking a first insulating layer IL21, a second insulating layer IL22, and a third insulating layer IL23.

Next, a separation insulating layer 440 may be formed on the second contact plug 430. For example, a trench may be formed by etching the second interlayer insulating layer IL2 and a conductive layer for a word line. The separation insulating layer 440 may be formed within the trench. Accordingly, the word line 420 may be formed.

Next, a first opening OP1 may be formed within the word line 420. The first opening OP1 may be formed within the second interlayer insulating layer IL2 and the word line 420, and may extend into the first interlayer insulating layer IL1 through the word line 420.

Next, a memory cell MC including a variable resistance layer 450 may be formed. The memory cell MC may further include an electrode layer 460. First, the variable resistance layer 450 may be formed within the first opening OP1. The variable resistance layer 450 may be formed along the inner side of the first opening OP1 so that the first opening OP1 is partially opened. Next, the electrode layer 460 may be formed within the variable resistance layer 450. The electrode layer 460 may be formed along the inner side of the variable resistance layer 450 so that the first opening OP1 is partially opened. Accordingly, the memory cell MC including the variable resistance layer 450 and the electrode layer 460 may be formed. For example, the memory cell MC includes a portion of the variable resistance layer 450 disposed within the first opening OP1 and a portion of the electrode layer 460 disposed within the portion of the variable resistance layer 450.

Next, a first conductive layer 481 may be formed within the first opening OP1. For example, the first opening OP1 may be filled with the first conductive layer 481. Accordingly, the first conductive layer 481 may protrude into the memory cell MC, and may protrude into the first interlayer insulating layer IL1 through the word line 420. The first conductive layer 481 may be a single layer or a multi-layer. For example, the first conductive layer 481 may include a barrier layer and a metal layer.

A risk in a process can be reduced because a subsequent process can be performed in the state in which the first opening OP1 has been filled with the first conductive layer 481. For example, if a subsequent process is performed in the state in which the first opening OP1 has been opened, roughness of the first conductive layer 481 may be increased in a process of depositing a hard mask HM within the first opening OP1 and etching the hard mask HM. In contrast, an increase in the roughness of the first conductive layer 481 can be reduced by performing a subsequent process in the state in which the first opening OP1 has been filled with the first conductive layer 481.

Figure 10A:
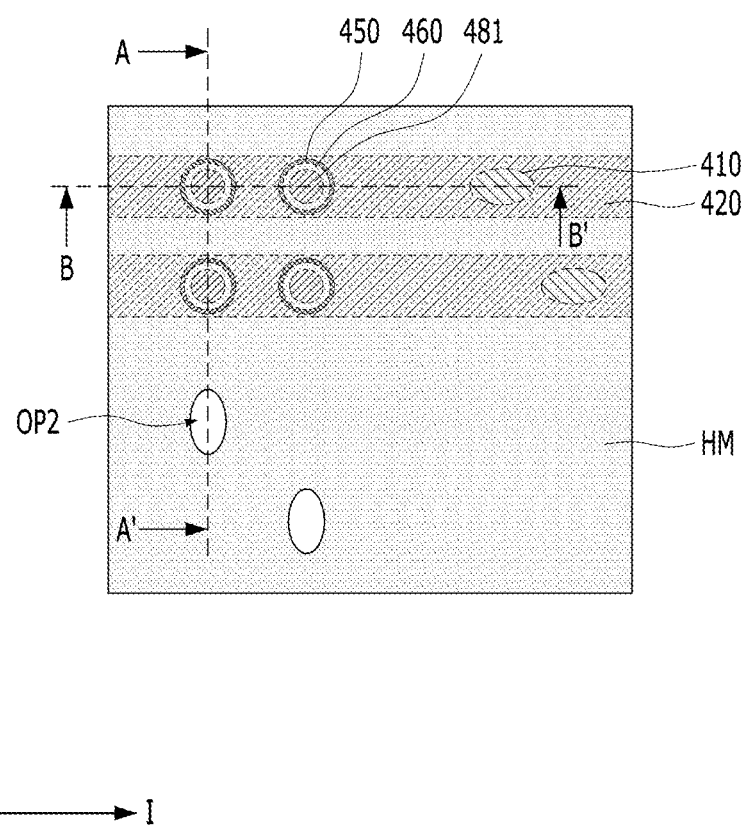
Figure 10B:
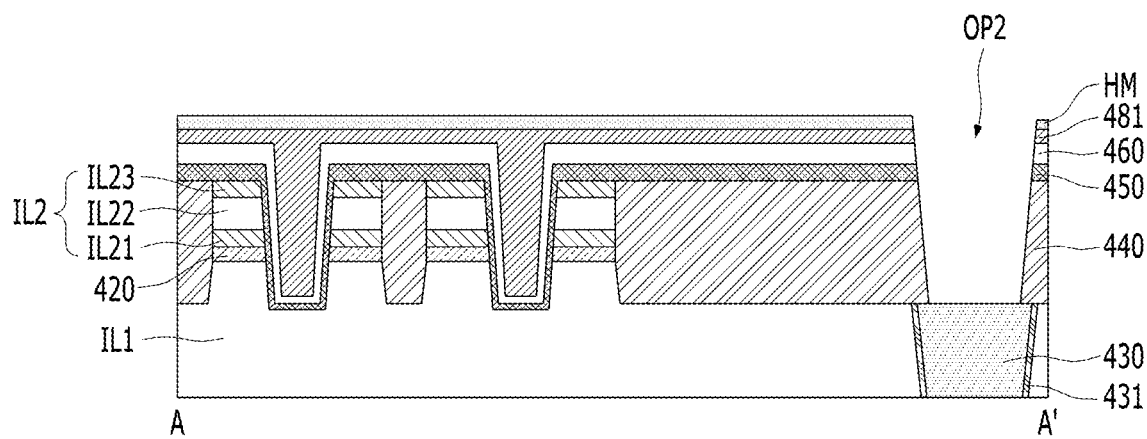
Figure 10C:
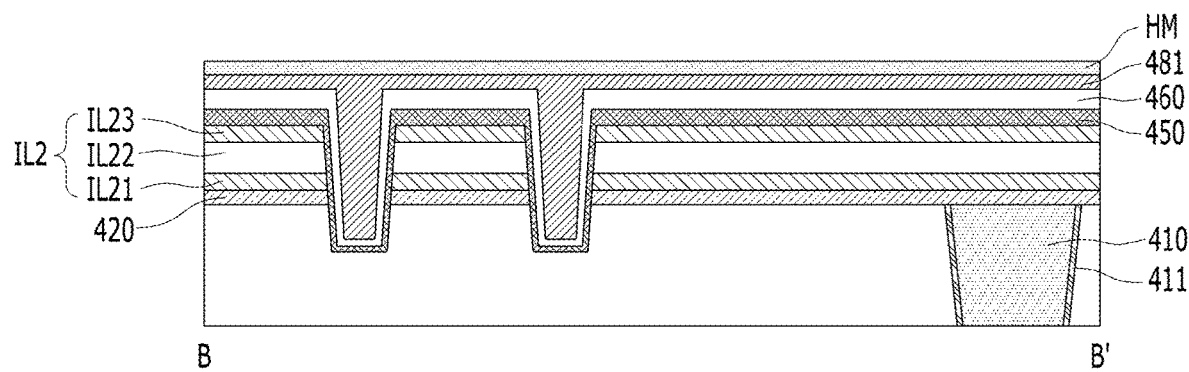

Referring to FIGS. 10A to 10C, a second opening OP2 may be formed. First, the hard mask HM may be formed on the first conductive layer 481. Next, the second opening OP2 may be formed by etching the first conductive layer 481, the memory cell MC, and the separation insulating layer 440 by using the hard mask HM as an etch barrier. The second opening OP2 may expose the second contact plug 430 through the separation insulating layer 440. The hard mask HM may be removed after the second opening OP2 is formed. In the process of removing the hard mask HM, a part of the first conductive layer 481 may be removed, but the variable resistance layer 450 might not be exposed. Accordingly, damage to the variable resistance layer 450 can be prevented. Furthermore, although the first conductive layer 481 is partially etched in the process of etching the hard mask HM, the roughness of the first conductive layer 481 can be improved because an opened area is not present in the first opening OP1. Specifically, since the first conductive layer 481 substantially completely fills the first opening OP1, the hard mask HM may not be formed within the first opening OP1, thereby obviating the need for etching the hard mask HM within the first opening OP1. As a result, when the first conductive layer 481 is partially etched in the process of etching the hard mask HM, the roughness of the first conductive layer 481 would be significantly reduced compared to when the hard mask HM is formed within the first opening OP1 and then etched from the first opening OP1.

Figure 11A:
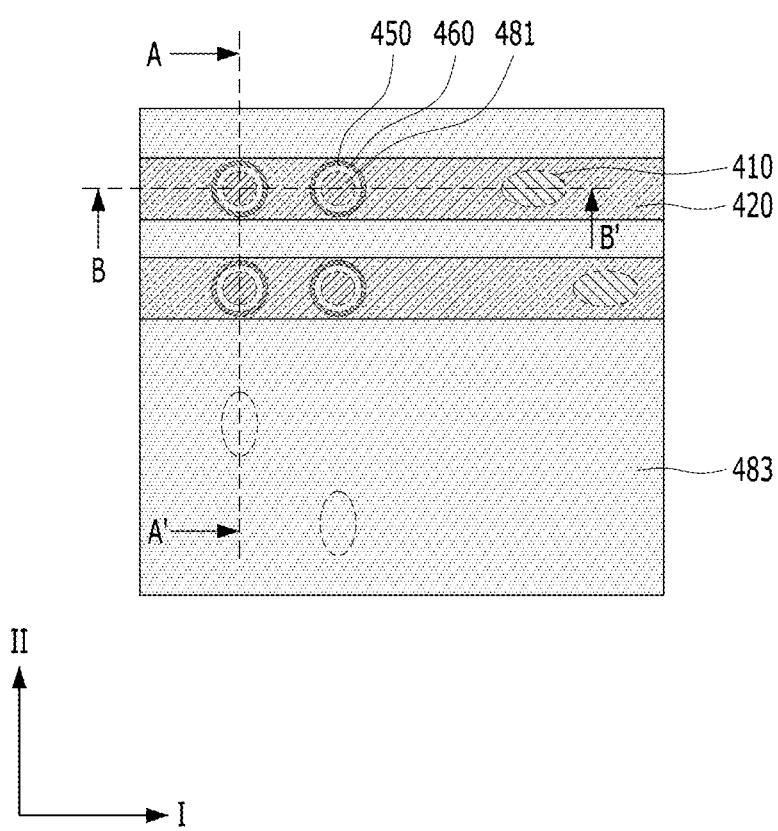
Figure 11B:
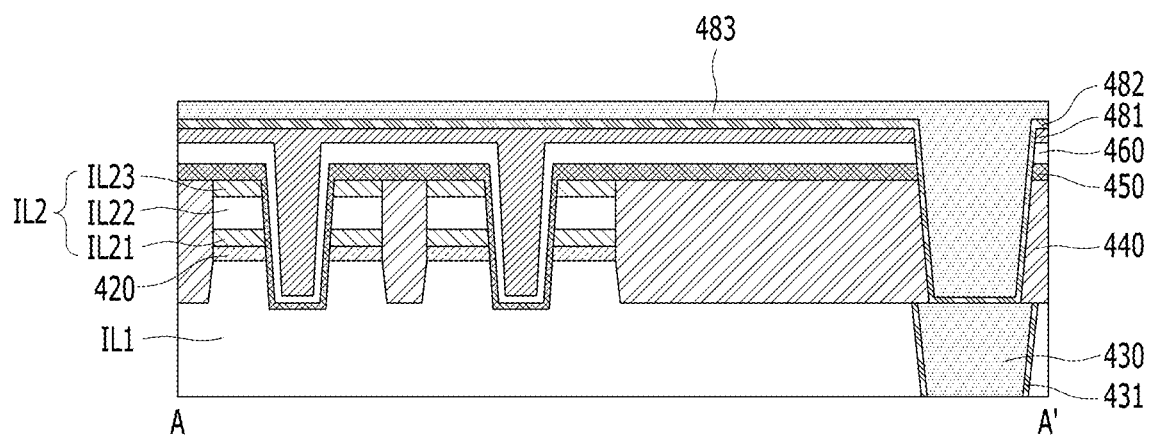
Figure 11C:
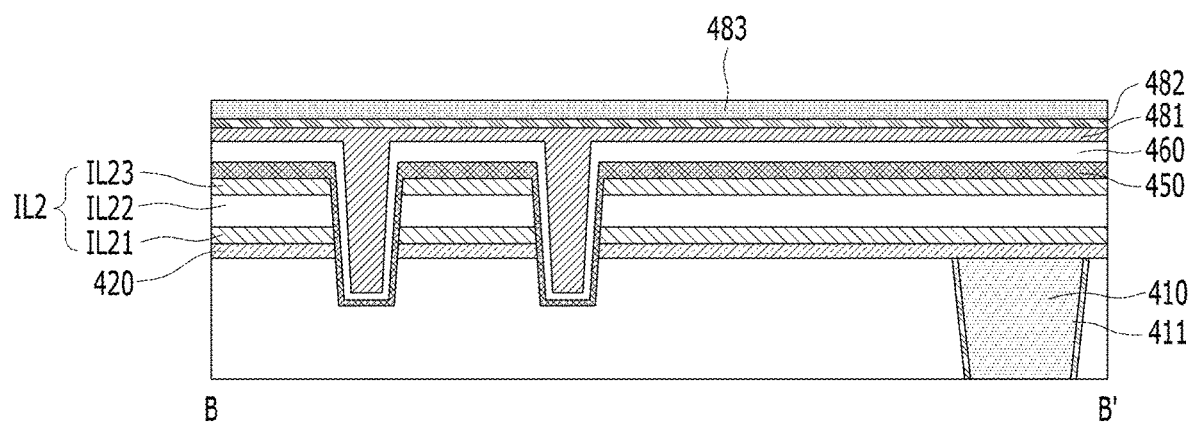

Referring to FIGS. 11A to 11C, a second conductive layer 483 may be formed. The second conductive layer 483 may be formed along the inner side of the second opening OP2. In this case, the second opening OP2 may be filled with the second conductive layer 483 so that an opened area is not present in the second opening OP2. Accordingly, the second conductive layer 483 may protrude into the memory cell MC, and may protrude into the separation insulating layer 440 through the word line 420.

Before the second conductive layer 483 is formed, a barrier layer 482 may be formed. The barrier layer 482 may be formed between the first conductive layer 481 and the second conductive layer 483.

Figure 12A:
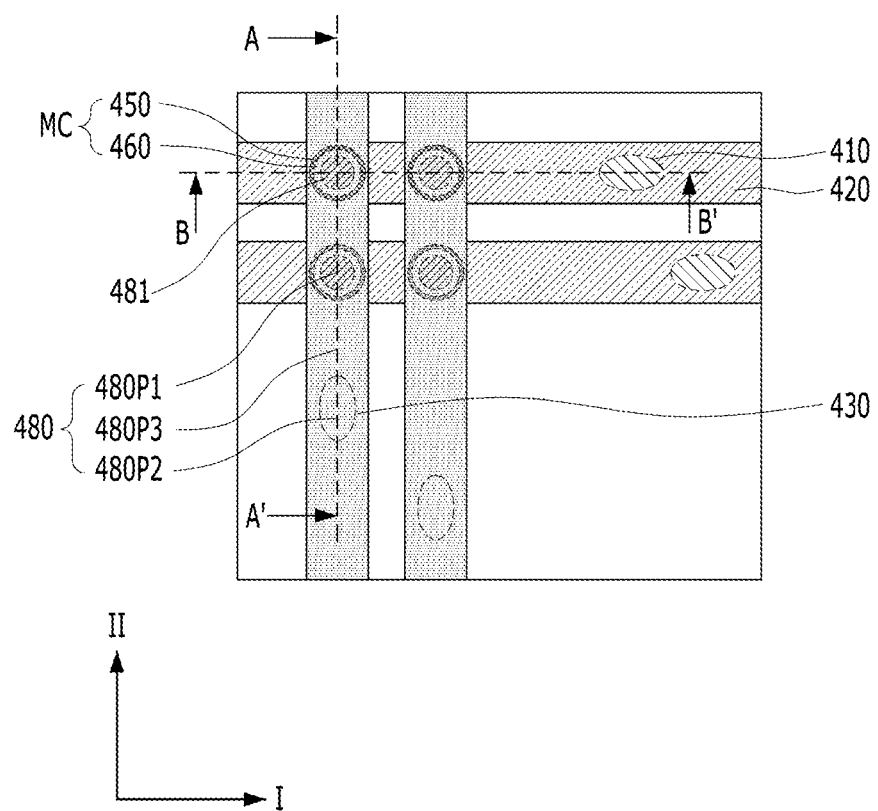
Figure 12B:
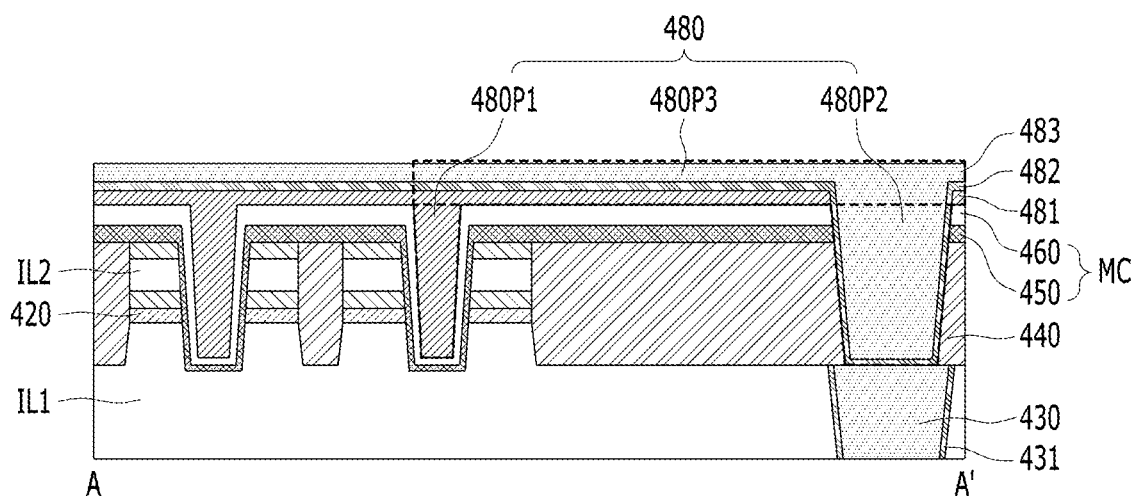
Figure 12C:
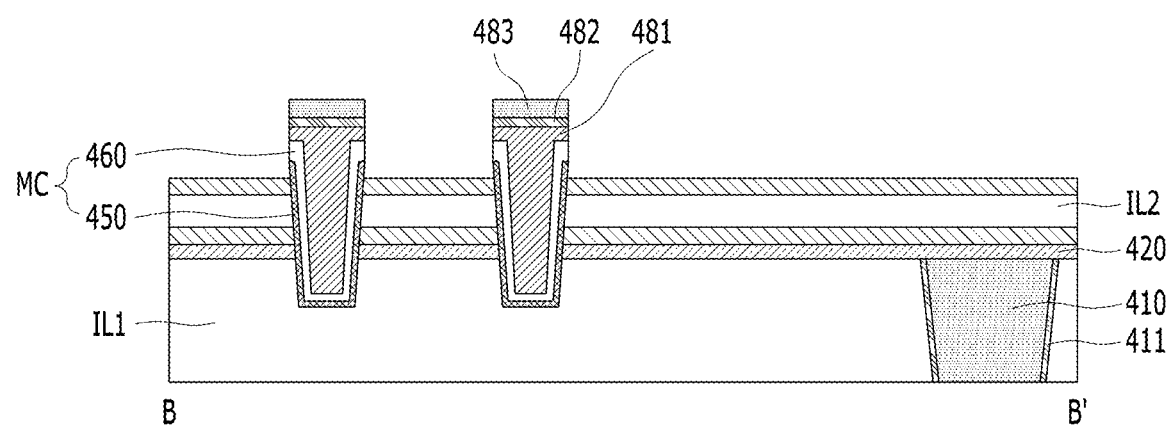

Referring to FIGS. 12A to 12C, a bit line 480 that extends in the second direction II may be formed. The bit lines 480 may be formed by patterning the second conductive layer 483, the barrier layer 482, and the first conductive layer 481. The bit line 480, including a first protruding part 480P1, a second protruding part 480P2, and a connection part 480P3 that connects the first protruding part 480P1 and the second protruding part 480P2 and that extends in the second direction II, may be formed.

In this case, the first protruding part 480P1 may include a first conductive layer 481 that protrudes into the variable resistance layer 450. The electrode layer 460 may be disposed between the first protruding part 480P1 and the variable resistance layer 450.

The second protruding part 480P2 may extend through the separation insulating layer 440, and may be electrically connected to the second contact plug 430. The second protruding part 480P2 may include the barrier layer 482 and the second conductive layer 483 within the barrier layer 482. The second protruding part 480P2 may play a role as a contact plug that connects the connection part 480P3 and the second contact plug 430.

The connection part 480P3 may include the first conductive layer 481, the barrier layer 482 on the first conductive layer 481, and the second conductive layer 483 on the barrier layer 482.

According to the aforementioned process, in depositing the conductive layers for forming the bit line 480, the conductive layers may be divided and deposited plural times. Accordingly, the variable resistance layer 450 under the conductive layer can be prevented from being damaged, such as being peeled, when the conductive layer is patterned, or damage to the variable resistance layer 450 when the conductive layer is patterned can be minimized.

Furthermore, the second opening OP2 may be formed in the state in which the first opening OP1 has been filled with the first conductive layer 481. In this process, the first conductive layer 481 may be partially etched. Since an opened area is not present in the first opening OP1, roughness of the second conductive layer 483 can be improved in the process of depositing the second conductive layer 483 for forming the bit line 480.

Although embodiments according to the technical spirit of the present disclosure have been described above with reference to the accompanying drawings, the above-described embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure.

What is claimed is:

1. A semiconductor device comprising:
   a first contact plug;
   a word line electrically connected to the first contact plug and extending in a first direction;
   a second contact plug;
   a bit line extending in a second direction that intersects the first direction; and
   a memory cell disposed between the word line and the bit line and comprising a variable resistance layer,
   wherein the bit line comprises a first protruding part that protrudes into the memory cell, a second protruding part that is connected to the second contact plug, and a connection part that connects the first protruding part and the second protruding part and that extends in the second direction.

2. The semiconductor device of claim 1, wherein the variable resistance layer surrounds a sidewall and a bottom of the first protruding part.

3. The semiconductor device of claim 1, wherein the memory cell further comprises an electrode layer disposed between the variable resistance layer and the first protruding part.

4. The semiconductor device of claim 1, wherein the first protruding part comprises:
   a first conductive layer disposed within the variable resistance layer;
   a barrier layer disposed within the first conductive layer; and
   a second conductive layer disposed within the barrier layer.

5. The semiconductor device of claim 1, wherein the second protruding part comprises:
   a barrier layer, and
   a second conductive layer disposed within the barrier layer.

6. The semiconductor device of claim 1, wherein the connection part comprises:
   a first conductive layer;
   a barrier layer disposed on the first conductive layer; and
   a second conductive layer disposed on the barrier layer.

7. The semiconductor device of claim 1, further comprising a separation insulating layer disposed on the second contact plug,
   wherein the second protruding part is electrically connected to the second contact plug and extends through the separation insulating layer.

8. A method of manufacturing a semiconductor device, comprising:
   forming a first contact plug;

forming a word line connected to the first contact plug and extending in a first direction;
forming a second contact plug;
forming a separation insulating layer on the second contact plug;
forming a first opening within the word line;
forming a second opening that exposes the second contact plug through the separation insulating layer; and
forming a bit line comprising a first protruding part extending in a second direction and disposed within the first opening, a second protruding part disposed within the second opening, and a connection part connecting the first protruding part and the second protruding part, the second direction intersecting the first direction.

9. The method of claim 8, further comprising forming a variable resistance layer within the first opening.

10. The method of claim 9, wherein the forming of the variable resistance layer comprises forming the variable resistance layer along an inner side of the first opening with a thickness sufficient to partially fill the first opening.

11. The method of claim 8, further comprising forming a first conductive layer within the first opening before forming the second opening.

12. The method of claim 11, wherein the forming of the first conductive layer comprises forming the first conductive layer along an inner side of the first opening with a thickness to partially fill the first opening.

13. The method of claim 8, wherein the forming of the second opening comprises forming the second opening when the first opening has been at least partially filled.

14. The method of claim 8, wherein the forming of the bit line comprises:
forming a second conductive layer along inner sides of the first opening and the second opening; and
forming the bit line by patterning the second conductive layer.

15. The method of claim 14, further comprising forming a barrier layer before forming the second conductive layer.

16. The method of claim 8, wherein the second protruding part of the bit line is electrically connected to the second contact plug.

17. The method of claim 8, wherein when the first contact plug is formed, the second contact plug is formed.

* * * * *